United States Patent
Stahlke

(10) Patent No.: US 7,991,225 B2
(45) Date of Patent: Aug. 2, 2011

(54) METHODS AND SYSTEMS FOR DYNAMIC COLOR EQUALIZATION

(75) Inventor: Daniel Stahlke, Fairbanks, AK (US)

(73) Assignee: University of Alaska, Fairbanks, AK (US)

( * ) Notice: Subject to any disclaimer, the term of this patent is extended or adjusted under 35 U.S.C. 154(b) by 976 days.

(21) Appl. No.: 11/682,205

(22) Filed: Mar. 5, 2007

(65) Prior Publication Data

US 2007/0206854 A1    Sep. 6, 2007

Related U.S. Application Data

(60) Provisional application No. 60/778,679, filed on Mar. 3, 2006.

(51) Int. Cl.
*G06K 9/00* (2006.01)
*G06K 9/36* (2006.01)

(52) U.S. Cl. ........ 382/167; 382/162; 382/168; 382/169; 382/170; 382/276

(58) Field of Classification Search .................. 382/167, 382/168, 162, 169, 170, 276
See application file for complete search history.

(56) References Cited

U.S. PATENT DOCUMENTS

| | | | |
|---|---|---|---|
| 4,353,092 A | 10/1982 | Bailey et al. | |
| 4,550,315 A | 10/1985 | Bass et al. | |
| 4,821,209 A | 4/1989 | Hempel et al. | |
| 5,014,222 A | 5/1991 | Donahue | |
| 5,042,077 A | 8/1991 | Burke | |
| 5,450,502 A * | 9/1995 | Eschbach et al. | 382/169 |
| 5,542,003 A | 7/1996 | Wofford | |
| 5,854,851 A * | 12/1998 | Bamberger et al. | 382/132 |
| 5,963,665 A * | 10/1999 | Kim et al. | 382/169 |
| 6,121,966 A | 9/2000 | Teodosio et al. | |
| 6,127,669 A * | 10/2000 | Sidiropoulos et al. | 250/208.1 |
| 6,163,621 A | 12/2000 | Paik et al. | |
| 6,400,852 B1 | 6/2002 | Miller, II et al. | |
| 6,407,749 B1 | 6/2002 | Duke | |
| 6,462,750 B1 | 10/2002 | Plow et al. | |
| 2002/0044156 A1 | 4/2002 | Maezawa et al. | |
| 2003/0035579 A1* | 2/2003 | Yang et al. | 382/169 |
| 2005/0031201 A1 | 2/2005 | Goh | |
| 2005/0197567 A1* | 9/2005 | Qian et al. | 600/425 |
| 2007/0033544 A1* | 2/2007 | Fleisher et al. | 715/800 |
| 2007/0058862 A1* | 3/2007 | Meier et al. | 382/170 |

OTHER PUBLICATIONS

Website: http://www.imagingresearch.com/applications/evaluating.asp; Evaluating Image Analysis Systems: Imaging Research Inc.; Leading Edge Image Acquisition and Analysis Systems; Oct. 24, 2005; pp. 1-15.

(Continued)

*Primary Examiner* — Bhavesh M Mehta
*Assistant Examiner* — Bernard Krasnic
(74) *Attorney, Agent, or Firm* — Ballard Spahr LLP

(57) ABSTRACT

Disclosed herein are methods and systems for dynamic color equalization that can be used for image viewer applications. The methods and systems described involve linking enhancement parameters to a changing viewport. When a large image is being viewed, only a portion of the image can fit in a viewer window at a time. A viewport can be defined as the portion of image data that is displayed on a screen. Scrolling or zooming the image can be described as moving the viewport.

24 Claims, 9 Drawing Sheets

OTHER PUBLICATIONS

Fanshier, et al.; "Impact of RAM Multiported Memories on Interactive Digital Image Processing Systems"; Advances in Display Technology; SPIE vol. 199; 1979; pp. 35-41.

Speckert, et al.; "Tools for Interpretation of Multispectral Data"; Extracting Meaning from Complex Data: Processing, Display, Interaction; SPIE vol. 1259; 1990; pp. 182-189.

Website: http://www.mesa3d.org/brianp/TR.html; "TR—OpenGL Tile Rendering Library"; Version 1.3; Oct. 16, 2005; pp. 1-8.

Website: http://www.neuron2.net/winhistogram.html; "Windowed Histogram Equalization Filter for VirtualDub"; Oct. 16, 2005; pp. 1-5.

* cited by examiner

Exemplary Operating Environment

METHODS AND SYSTEMS FOR DYNAMIC COLOR EQUALIZATION

CROSS REFERENCE TO RELATED PATENT APPLICATION

This application claims priority to U.S. Provisional Application No. 60/778,679 filed Mar. 3, 2006, herein incorporated herein by reference in its entirety.

BACKGROUND

Computer programs designed for viewing images typically have some form of image enhancement option (i.e., contrast stretch, histogram equalization, etc. . . . ). Current implementations typically perform image enhancement based upon statistics gathered from the image as a whole or from a user-selected region of the image (as described in U.S. Pat. No. 5,542,003, incorporated herein by reference in its entirety). The methods and systems described herein differ from currently used systems in that the image enhancement varies dynamically as the user moves the viewport. In other words, the image will be dynamically enhanced during pan and zoom operations.

SUMMARY

Disclosed herein are methods and systems for dynamic color equalization that can be used for image viewer applications. The methods and systems described involve linking enhancement parameters to a changing viewport. When a large image is being viewed, only a portion of the image can fit in a viewer window at a time. A viewport can be defined as the portion of image data that is displayed on a screen. Scrolling or zooming the image can be described as moving the viewport.

Additional advantages of the methods and systems will be set forth in part in the description which follows or may be learned by practice of the methods and systems. The advantages of the methods and systems will be realized and attained by means of the elements and combinations particularly pointed out in the appended claims. It is to be understood that both the foregoing general description and the following detailed description are exemplary and explanatory only and are not restrictive of the methods and systems, as claimed.

BRIEF DESCRIPTION OF THE DRAWINGS

The accompanying drawings, which are incorporated in and constitute a part of this specification, illustrate embodiments of the methods and systems and together with the description, serve to explain the principles of the methods and systems.

DETAILED DESCRIPTION

Figure 1A:
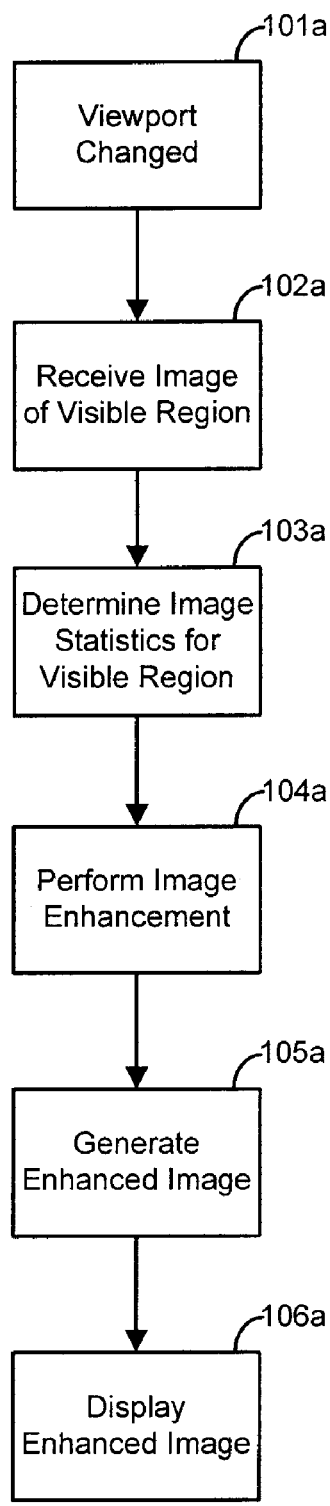
FIG. 1a illustrates exemplary steps in a method disclosed herein.

Before the present methods and systems are disclosed and described, it is to be understood that the methods and systems are not limited to specific methods or specific components and as such may vary. It is also to be understood that the terminology used herein is for the purpose of describing particular embodiments only and is not intended to be limiting.

As used in the specification and the appended claims, the singular forms "a," "an" and "the" include plural referents unless the context clearly dictates otherwise.

Ranges may be expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint.

"Optional" or "optionally" means that the subsequently described event or circumstance may or may not occur, and that the description includes instances where said event or circumstance occurs and instances where it does not.

The present methods and systems may be understood more readily by reference to the following detailed description of preferred embodiments of the methods and systems and the Examples included therein and to the Figures and their previous and following description.

Disclosed herein are methods and systems for dynamic color equalization that can be used for image viewer applications. The methods and systems described involve linking enhancement parameters to a changing viewport. When a large image is being viewed, only a portion of the image can fit in a viewer window at a time. A viewport can be defined as the portion of image data that is displayed on a screen. Scrolling or zooming the image can be described as moving the viewport.

A large image may span a range of colors across the entire image, but only a limited range of colors within a small area. For example, a satellite image can contain both daytime and nighttime regions and thus span from nearly black in one area to very bright in another area. When a small portion of the image is considered (for example, a river or crop field) the range of colors may be limited and barely perceptible to the human eye. Applying a fixed global color equalization will either destroy the overall color variation (e.g. daytime vs. nighttime areas) or will not have optimal performance over small-scale areas.

Linking the equalization parameters to the viewport solves this problem. When a scaled down (i.e. zoomed out) version of the image is being viewed, the whole image is taken into consideration when computing the color equalization. When a user zooms into, for example, a very dark portion of the image, the equalization parameters change so that the image is brightened. As the user pans across the image, the equalization parameters change dynamically in order to maintain optimal color balance. The technique comprises continually recomputing a color equalization function, based upon what is on the screen at any given time, as the viewport is moved.

I. Image Enhancement

A. Histogram Equalization

Histogram equalization is an image enhancement technique in which color values are remapped in such a way as to optimize their distribution across the entire color space. The first step involves counting the frequency of occurrence of each color in the source image. This information is then used to create a transfer function that will cause the frequency distribution of the target image to match, as closely as possible, a pre-selected target distribution. The target distribution can be, for example, a uniform or a Gaussian distribution.

The simplest way to achieve this mode of display is to recompute the color equalization parameters each time a new viewport is displayed on the screen. It is also possible to create a much faster implementation by dividing the image into tiles and pre-computing statistics for each tile. When a new viewport is to be displayed, the program determines which tiles are visible and uses the pre-computed values to find the statistics of the whole image. Quantities such as histogram counts, average values, min/max values and standard deviation can be computed based upon tile statistics. Tiles that are only partially visible in a given viewport can either be counted, discarded, or recomputed pixel-by-pixel based upon which portion is on the screen.

Figure 9:
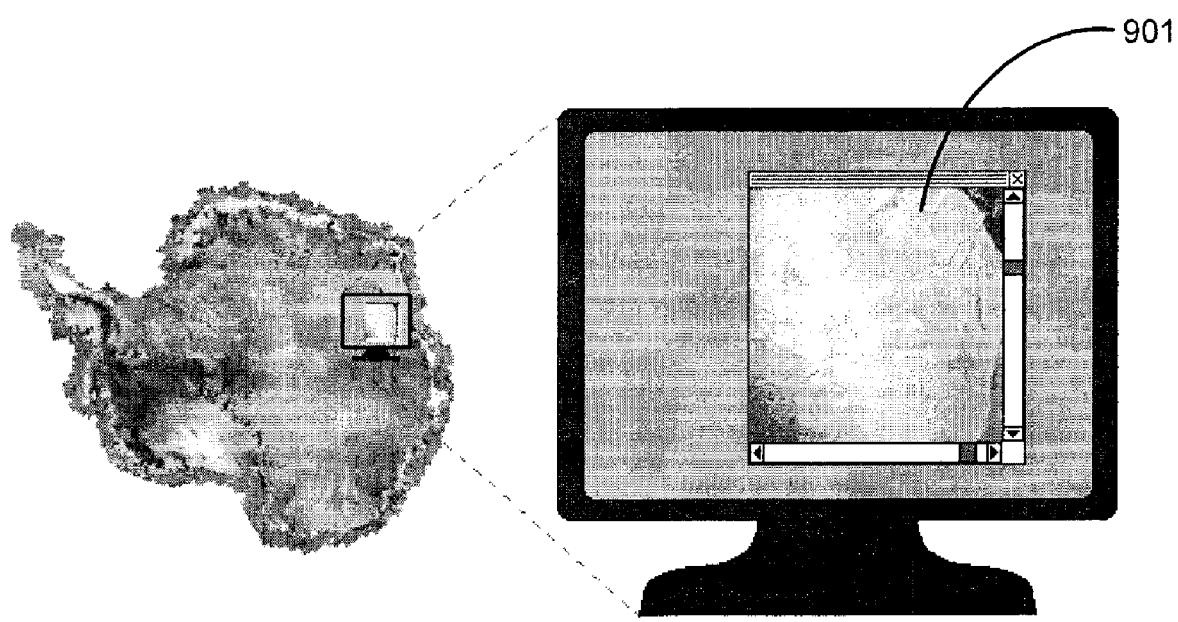
FIG. 9 illustrates an exemplary viewport.

A tile is a member of a collection of tiles collectively known as a tiling. A tiling is a pairwise disjoint cover of the domain of the image being displayed. A viewport is defined as the portion of the image which is visible on the screen. An example of a viewport is illustrated in FIG. 9. The viewport is indicated as 901.

B. Contrast Stretch

A contrast stretch is a point operation (i.e., the value of a pixel in the stretched image is a function only of the corresponding pixel in the original image) designed to enhance an image for visual interpretation. An example of Contrast Stretch involves identifying lower and upper bounds from the histogram (usually the minimum and maximum brightness values in the image) and applying a transformation to stretch this range to fill the full range.

II. Method

A. Generally

FIG. 1a illustrates exemplary steps in a method disclosed. At block 101a, a viewport can be changed such that a portion of an image not previously visible is visible, or in some cases such that a portion previously visible now isn't, such as when zooming in. In all cases, the extent of the visible region will change in some way. The same applies for blocks 201a and 201b, in FIG. 2. At block 102a, the image of the visible region can be received. At block 103a, statistics can be determined for the visible region. Image statistics determined depend on the type of image enhancement performed at block 104a. Image enhancement can include but is not limited to, histogram equalization, contrast stretch, and the like. The image statistics can include, but are not limited to, histogram counts, average values, min/max values and standard deviation. After image enhancement for the visible region is performed at block 104a, an enhanced image of the visible region can be generated at block 105a. Finally, at block 106a, the enhanced image can be displayed on a display device.

Figure 1B:
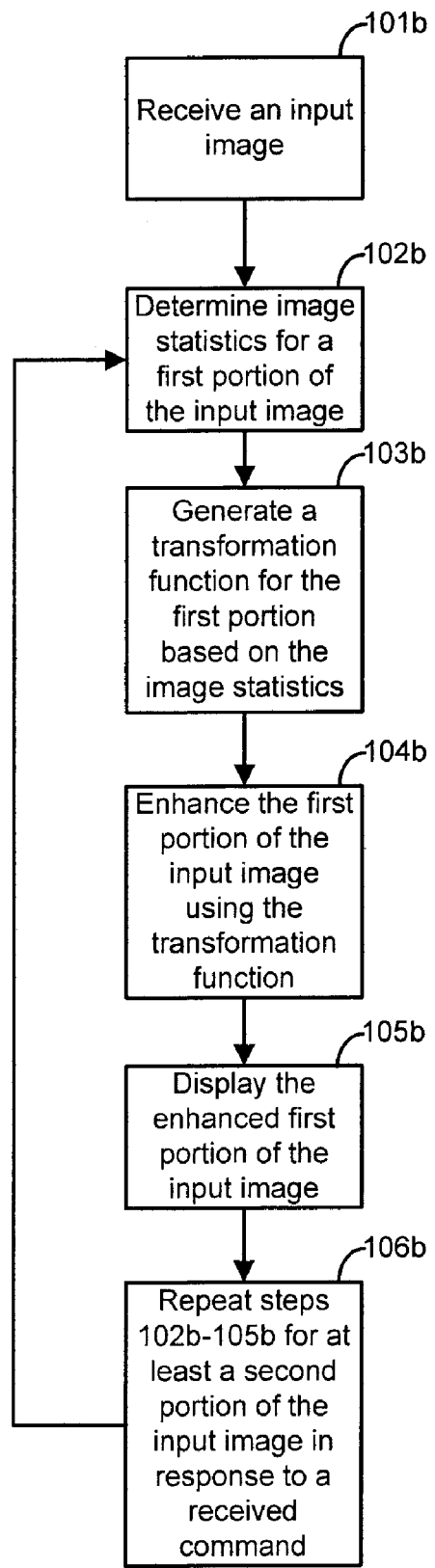
FIG. 1b illustrates exemplary steps in a method disclosed herein.

FIG. 1b illustrates exemplary steps in a method disclosed. A method for dynamic color equalization of an input image, comprising receiving the input image at block 101b, determining image statistics for at least a first portion of the input image at block 102b, generating a transformation function for the first portion of the input image based at least in part on the image statistics at block 103b, enhancing the first portion of the input image using the transformation function at block 104b, displaying the enhanced first portion of the input image at block 105b, and repeating blocks 102b-105b for at least a second portion of the input image in response to a received command at block 106b. Thus allowing for the adjusting of colors in the portions of the input image in a continuous and smooth manner throughout the duration of the received command. An input image can be comprised of one or more portions. Depending on the received command, portions of the input image can correspond to a visible portion in a viewport.

The step of determining image statistics for at least a first portion of the input image can comprise determining a histogram of the first portion of the input image, wherein the histogram represents a number of pixels of each of a plurality of color values in the first portion of the input image. The step of generating a transformation function can further comprise receiving a pre-determined target histogram and the first transformation function is generated based at least in part on the histogram and the pre-determined target histogram. The predetermined target histogram can represent a Gaussian color distribution, a uniform color distribution, and the like.

The step of determining image statistics for at least a first portion of the input image can comprise determining minimum and maximum color values for the first portion of the input image based on pixels in the first portion of the input image, wherein the minimum and maximum color values for the first portion of the input image define a first range. The method can further comprise the step of receiving a pre-determined range of color values, the pre-determined range defining a minimum pre-determined color value and maximum pre-determined color value, wherein the step of generating a transformation function the first portion of the input image comprises generating a linear scaling function to map the first range to the pre-determined range.

The method can further comprise dividing the input image into at least a first and second tile, wherein each of the first and second tiles comprises at least two pixels each having a respective color value, determining first tile statistics for the first tile, and determining second tile statistics for the second tile, wherein the steps of dividing the image and determining the first and second tile statistics occur prior to determining image statistics for at least a first portion of the input image. The first portion of the input image can comprise at least one of the first and second tiles, and wherein the step of determining image statistics for at least a portion of the first input image is based at least in part on the tile statistics of the respective one or more tiles of the first portion of the input image.

The step of determining the first tile statistics can comprise determining a first tile histogram of the first tile and the step of determining the second tile statistics comprises determining a second tile histogram of the second tile, wherein the first and second tile histograms represent the number of pixels of each of a plurality of color values in each of the respective first and second tiles. The step of determining image statistics for the first portion of the input image can comprise determining a histogram of the first portion of the input image based at least in part on the tile histogram of the respective one or more tiles of the first portion of the input image. The method can further comprise receiving a pre-determined target histogram, wherein the step of generating a transformation function for the first portion of the input image comprises generating a transformation function based on the histogram of the first portion of the input image and the pre-determined target histogram.

The step of determining the first tile statistics can comprise determining minimum and maximum color values for the first tile based on the pixels in the first tile, wherein the step of determining the second tile statistics comprises determining minimum and maximum color values for the second tile based on the pixels in the second tile, and wherein the minimum and maximum values for each of the first and second tiles define respective first and second tile ranges. The step of determining image statistics for the first portion of the input image can comprise determining minimum and maximum color values for the first portion of the input image based at least in part on the minimum and maximum color values of the respective one or more tiles of the first portion of the input image, and wherein the minimum and maximum color values for each the first portion of the input image defines respective a first range. The method can further comprise the step of receiving a pre-determined range of color values, the pre-determined range defining a minimum pre-determined color value and maximum pre-determined color value, wherein the step of generating a transformation function for the first portion of the input image comprises generating a linear scaling function to map the first range to the pre-determined range.

For zooming, the first portion of the input image can be, for example, a subset of the second portion of the input image, or the second portion of the input image can be, for example, a subset of the first portion of the input image. For panning, the second portion of the input image can comprise part of the first portion of the input image. The received command can be, for example, zooming in, zooming out, panning, a combination thereof, and the like.

Figure 2A:
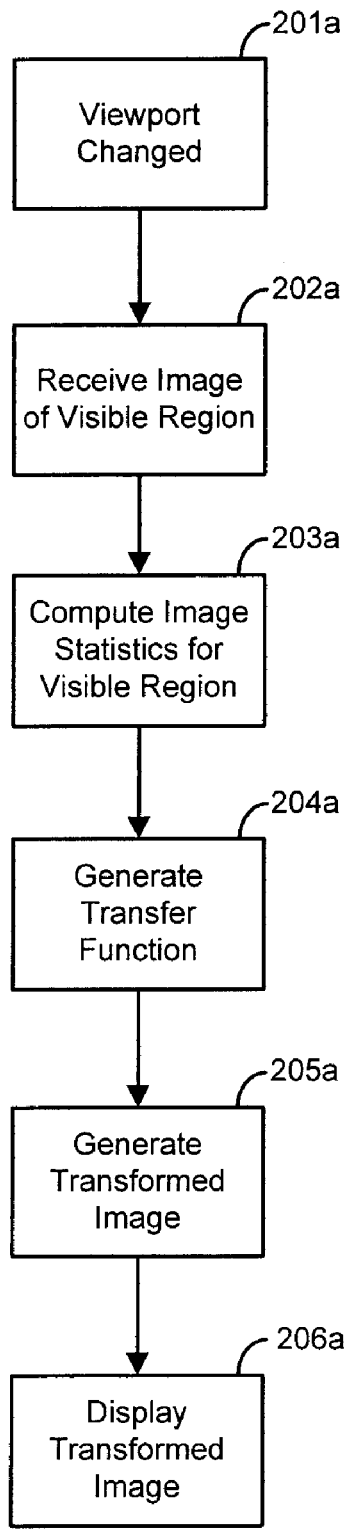
FIG. 2a illustrates exemplary steps in an embodiment of a method disclosed wherein the image enhancement performed is histogram equalization.

FIG. 2a illustrates exemplary steps in a method wherein the image enhancement performed is histogram equalization. At block 201a, a viewport is changed such that a portion of an image not previously visible is visible. At block 202a, the image of the visible region is received. At block 203a, statistics are computed for the visible region. At block 204a, a transfer function is generated and used at block 205a to generate a transformed image. At block 206a, the transformed image can be displayed on a display device.

Figure 2B:
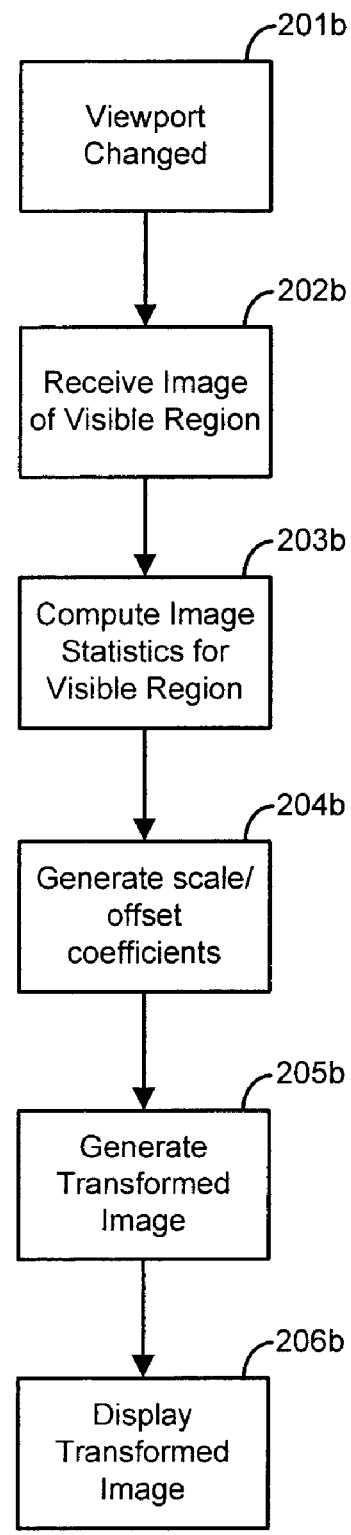
FIG. 2b illustrates exemplary steps in an embodiment of a method disclosed wherein the image enhancement performed is contrast stretch.

FIG. 2b illustrates exemplary steps in an embodiment of a method wherein the image enhancement performed is contrast stretch. At block 201b, a viewport is changed such that a portion of an image not previously visible is visible. At block 202b, the image of the visible region is received. At block 203b, statistics are computed for the visible region. At block 204b, scale/offset coefficients are generated and used at block 205b to generate a transformed image. At block 206b, the transformed image can be displayed on a display device.

B. Dynamic Equalization

In an embodiment, the method can determine color equalization parameters each time the viewport is changed (when the visible region of an image changes in the viewport). Whenever the viewport is changed the method determines information about which subset of the image is visible within the viewport. Only pixels within the viewport area are used when computing the transfer function. The equalized image is then displayed within the viewport. In the case of continuous operations (such as panning) this sequence of events can continually be performed.

Figure 3:
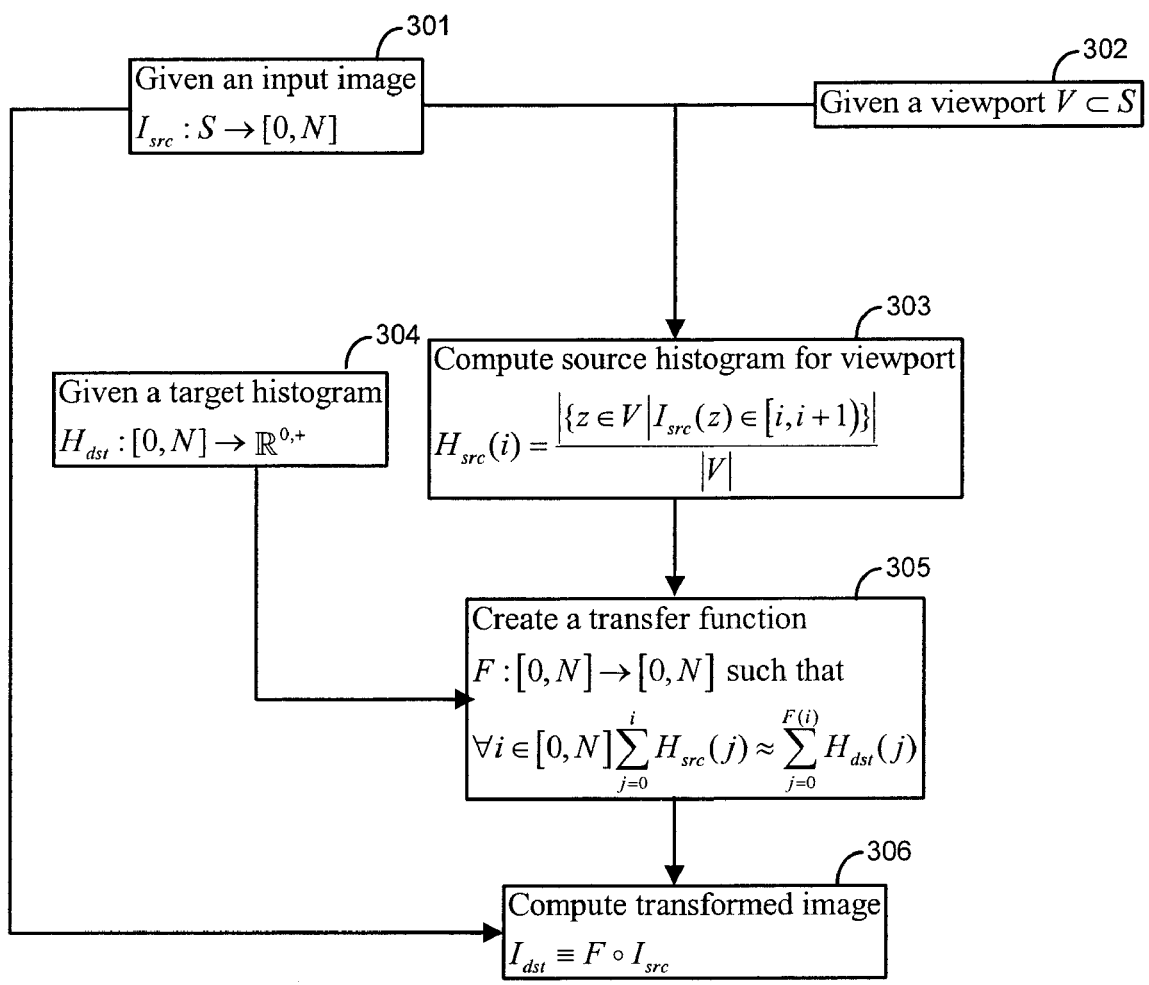
FIG. 3 illustrates an exemplary method for determining color equalization parameters each time the viewport is changed, utilizing histogram equalization for image enhancement.

Equations in this description use variables with meanings as follows:
$I_{src}$ source image
$I_{dst}$ final image to be displayed on screen
S pixel space of entire source image (i.e. domain of $I_{src}$)
V pixel space of viewport
N maximum color value of source image
$H_{src}$ histogram for source image
$H_{dst}$ target histogram
F transfer function
$T_\alpha$ pixel space of the tile of index $\alpha$
$\alpha$ tile index
A set of all tile indices
B set of indices of tiles intersecting viewport
$H_\alpha$ histogram for a tile
$\mathbb{R}^{0,+}$ nonnegative real numbers
$min_\alpha$ minimum pixel value for a tile
$max_\alpha$ maximum pixel value for a tile
$min_{src}$ minimum pixel value in viewport
$max_{src}$ maximum pixel value in viewport
$min_{dst}$ minimum pixel value for target image
$max_{dst}$ maximum pixel value for target image
m multiplier for linear contrast stretch
b offset for linear contrast stretch FIG. 3 illustrates an exemplary method for determining color equalization parameters each time the viewport is changed, utilizing histogram equalization for image enhancement. At block 301, the method receives an input image $I_{src}$: S $\to$[0,N] and at block 302 the method receives a viewport V$\subset$S. At block 303, based on the input image and the viewport, the method can determine a source histogram for the viewport, $$H_{src}(i) = \frac{|\{z \in V | I_{src}(z) \in [i, i+1)\}|}{|V|}.$$

At block 304, the method receives a target histogram, $H_{dst}$:[0,N]$\to \mathbb{R}^{0,+}$. At block 305, based on the source histogram and the target histogram, the method can generate a transfer function F:[0,N]$\to$[0,N] such that $$\forall i \in [0, N] \sum_{j=0}^{i} H_{src}(j) \approx \sum_{j=0}^{F(i)} H_{dst}(j).$$

Finally, at block 306, a transformed image $I_{dst}$=F$\circ I_{src}$ can be generated.

C. Dynamic Equalization with Tile Division and Pre-Computed Statistics

In another embodiment, the method can determine color equalization parameters each time a new viewport is displayed utilizing tile division and pre-computed statistics. Initially, a tiling of the image is selected and statistics determined for a tile of the image. Statistics can be determined for more than one tile of the image, including all tiles of the image. The statistics selected for determination depends upon the particular color equalization method being used. For histogram equalization image enhancement, histograms can be computed for each tile. For contrast stretch image enhancement, minimum and maximum values can be computed for each tile. These pre-computed statistics can be passed to a color equalization subroutine to speed computation. Using this technique, areas of the image covered by tiles that are fully, or partially, within the viewport can be analyzed using the pre-computed tile statistics.

Figure 4:
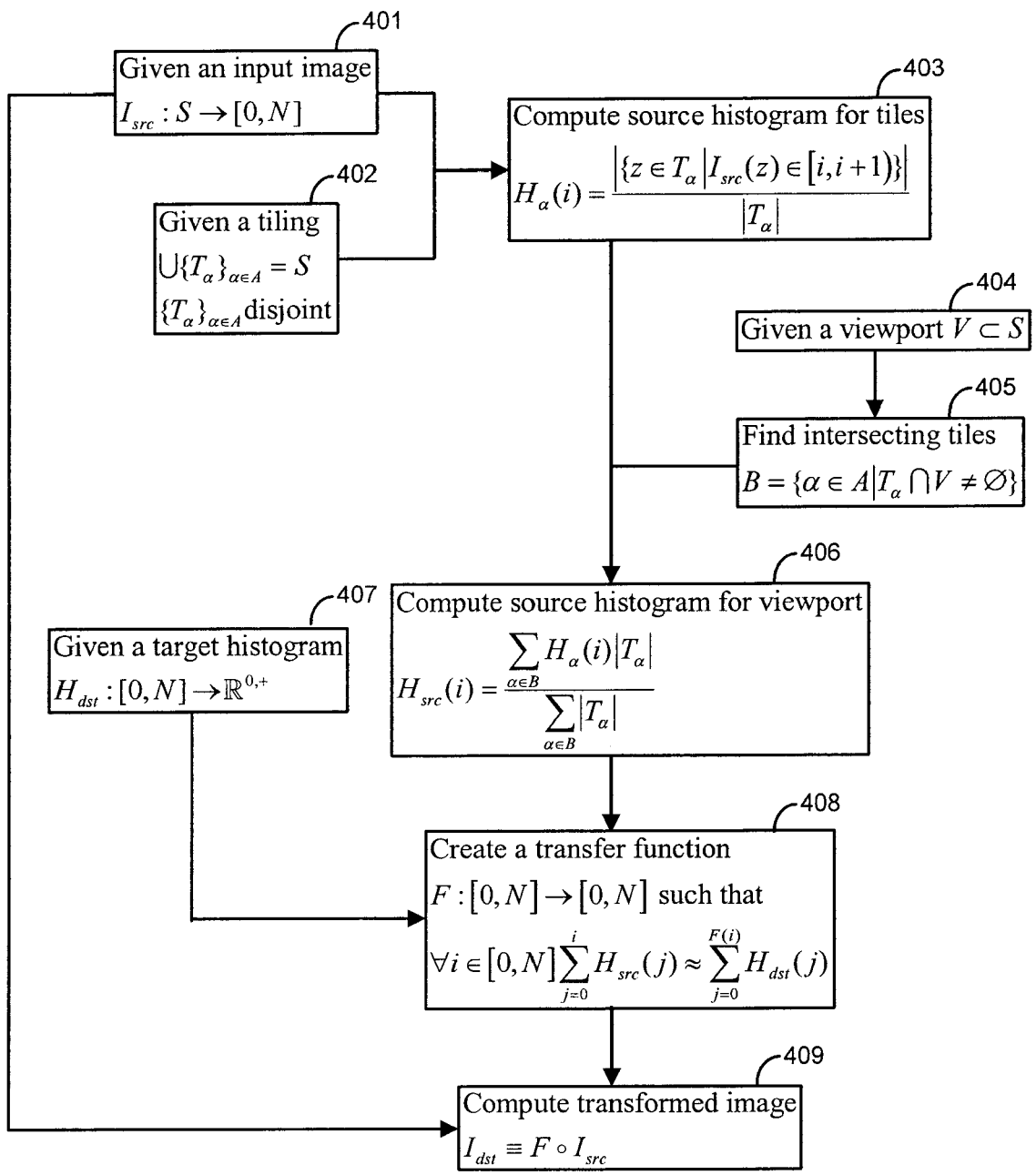
FIG. 4 illustrates an exemplary method for determining color equalization parameters each time a new viewport is displayed utilizing tile division and pre-computed statistics in conjunction with histogram equalization.

FIG. 4 illustrates an exemplary method for determining color equalization parameters each time a new viewport is displayed utilizing tile division and pre-computed statistics in conjunction with histogram equalization. At block 401, the method receives an input image $I_{src}:S\rightarrow[0,N]$. At block 402, the method receives a tiling $\cup\{T_\alpha\}_{\alpha\in A}=S$; $\{T_\alpha\}_{\alpha\in A}$ disjoint. Then at block 403, a source histogram $$H_\alpha(i) = \frac{|\{z \in T_\alpha | I_{src}(z) \in [i, i+1)\}|}{|T_\alpha|}$$

can be determined for one or more tiles based on the input image and the tiling. At block 404, the method can receive a viewport $V \subset S$. At block 405, the method can find intersecting tiles $B=\{\alpha\in A|T_\alpha\cap V\neq\emptyset\}$. The method can then, at block 406, determine a source histogram $$H_{src}(i) = \frac{\sum_{\alpha\in B} H_\alpha(i)|T_\alpha|}{\sum_{\alpha\in B} |T_\alpha|}$$

for the viewport based on the received tile source histogram and intersecting tiles in the viewport. At block 407, the method receives a target histogram, $H_{dst}:[0,N]\rightarrow\mathbb{R}^{0,+}$. At block 408, based on the source histogram for the viewport and the target histogram, the method can generate a transfer function $F:[0,N]\rightarrow[0,N]$ such that $$\forall\, i \in [0, N] \sum_{j=0}^{i} H_{src}(j) \approx \sum_{j=0}^{F(i)} H_{dst}(j).$$

Finally, at block 409, a transformed image $I_{dst}=F\circ I_{src}$ can be generated.

Figure 5:
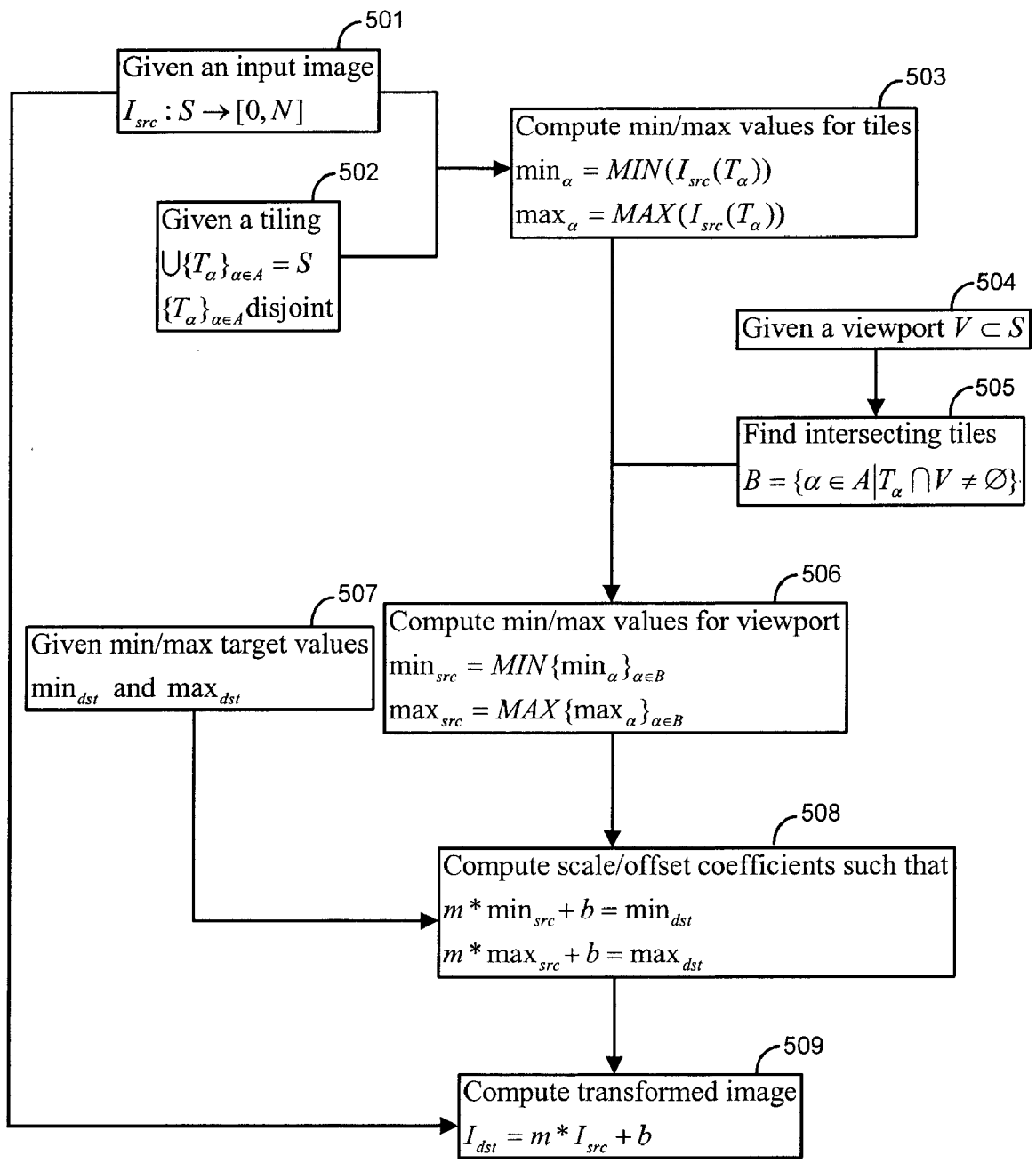
FIG. 5 illustrates an exemplary method for determining color equalization parameters each time a new viewport is displayed utilizing tile division and pre-computed statistics in conjunction with contrast stretch.

FIG. 5 illustrates an exemplary method for determining color equalization parameters each time a new viewport is displayed utilizing tile division and pre-computed statistics in conjunction with contrast stretch. At block 501, the method receives an input image $I_{src}:S\rightarrow[0,N]$. At block 502, the method receives a tiling $\cup\{T_\alpha\}_{\alpha\in A}=S$; $\{T_\alpha\}_{\alpha\in A}$ disjoint. Then at block 503, a min/max value $$\min_\alpha = \text{MIN}(I_{src}(T_\alpha))$$
$$\max_\alpha = \text{MAX}(I_{src}(T_\alpha))$$

can be determined for one or more tiles based on the input image and the tiling. At block 504, the method can receive a viewport $V \subset S$. At block 505, the method can find intersecting tiles $B=\{\alpha\in A|T_\alpha\cap V\neq\emptyset\}$. The method can then, at block 506, determine a $$\text{min/max value} \quad \begin{aligned} \min_{src} &= \text{MIN}\{\min_\alpha\}_{\alpha\in B} \\ \max_{src} &= \text{MAX}\{\max_\alpha\}_{\alpha\in B} \end{aligned}$$

for the viewport based on the received tile min/max value and intersecting tiles in the viewport. At block 507, the method receives a target min/max value, $\min_{dst}$ and $\max_{dst}$. At block 508, based on the min/max value for the viewport and the target min/max value, the method can generate scale/offset coefficients such that $$m*\min_{src}+b = \min_{dst}$$
$$m*\max_{src}+b = \max_{dst}.$$

Finally, at block 509, a transformed image $I_{dst}=m*I_{src}+b$ can be generated.

D. Dynamic Equalization with Overview Viewport

In another embodiment, the method can determine color equalization parameters each time a new viewport is displayed wherein the viewport is an overview viewport (zoomed out). While the methods described previously can also be modified for use with an overview viewport, the method described here performs faster. To support tile optimization in cases of different zoom levels, it is necessary to have different tilings for different ranges of zoom level. This ensures that the collection of visible tiles is a manageable size. An efficient method to achieve this is by using a pyramiding technique that can comprise the steps of: 1. Tile statistics are first computed for the most detailed zoom level. 2. Adjacent tiles are grouped into larger tiles for a less-detailed tiling (to be used when zooming out). 3. Statistics for these tile groups are computed using the statistics for the tiles they are made of.

For overview viewports it can be useful to have tiles that cover larger regions of the image. These can be computed from scratch or by combining the statistics from the smaller tiles. A quad-tree spatial partitioning scheme can be used for this. Quantities such as min/max and average are quick to compute from many tiles, so in this case it is no problem to tally up thousands of tiles. For histogram counts, combining the statistics of many tiles is slower, so the quad-tree would be optimal since it reduces the number of tiles that need to be tallied. Once the statistics for the viewport image have been computed a transfer function can be generated using the techniques previously described.

E. Dynamic Equalization with Motion Picture

In another embodiment, the method can determine color equalization parameters each time a new viewport is displayed wherein the image is a motion picture. The same techniques are used as described above, except that the image is considered as being three-dimensional instead of two-dimensional (the third dimension being time). In this case the viewport can be defined the same for the spatial extents (i.e. the portion displayed on the screen) but the temporal extent can have a user-selectable definition. In other words, the viewport for an animated sequence can be the set product of 1) a set of frame timecodes and 2) the viewport for the visible frame. Examples of possible temporal extents are: 1) A moving window of fixed length centered about the currently displayed frame and 2) A fixed subsequence of the video.

In the case of a motion picture, statistics can be used not only on the spatial viewport but also on a user-defined temporal viewport. The temporal viewport can be fixed in time (e.g. encompassing an entire subsequence of the video) or can be a moving window centered upon the frame that is currently being displayed. For speed optimization, tiles can be used as described above. The tiles are three dimensional rather than two dimensional, the third dimension being temporal.

III. System

Figure 6:
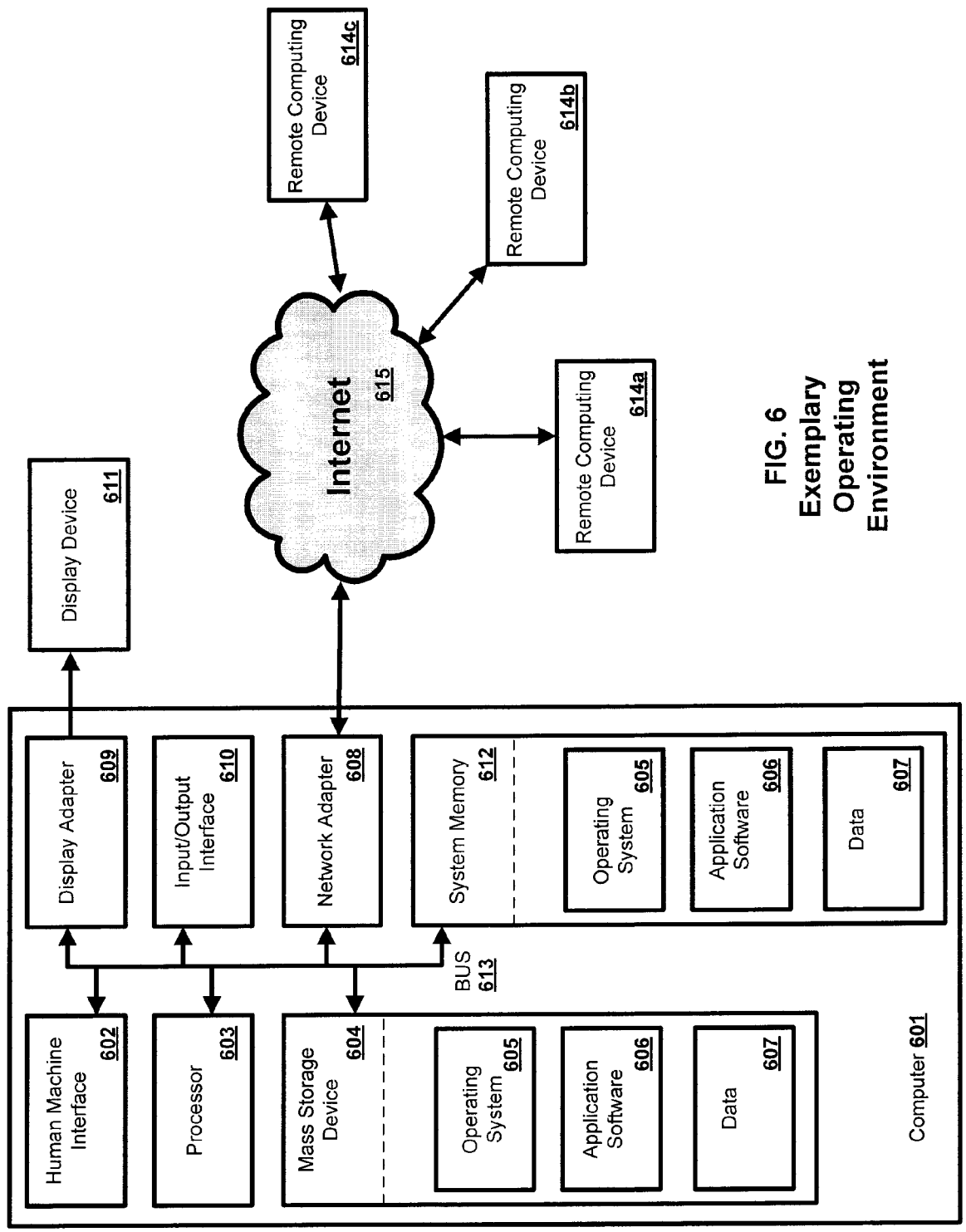
FIG. 6 is a block diagram illustrating an exemplary operating environment for performing the disclosed method.

FIG. 6 is a block diagram illustrating an exemplary operating environment for performing the disclosed method. This exemplary operating environment is only an example of an operating environment and is not intended to suggest any limitation as to the scope of use or functionality of operating environment architecture. Neither should the operating environment be interpreted as having any dependency or requirement relating to any one or combination of components illustrated in the exemplary operating environment.

The method can be operational with numerous other general purpose or special purpose computing system environments or configurations. Examples of well known computing systems, environments, and/or configurations that may be suitable for use with the system and method include, but are not limited to, personal computers, server computers, laptop devices, and multiprocessor systems. Additional examples include set top boxes, programmable consumer electronics, network PCs, minicomputers, mainframe computers, distributed computing environments that include any of the above systems or devices, and the like.

The method may be described in the general context of computer instructions, such as program modules, being executed by a computer. Generally, program modules include routines, programs, objects, components, data structures, etc. that perform particular tasks or implement particular abstract data types. The system and method may also be practiced in distributed computing environments where tasks are performed by remote processing devices that are linked through a communications network. In a distributed computing environment, program modules may be located in both local and remote computer storage media including memory storage devices.

The method disclosed herein can be implemented via a general-purpose computing device in the form of a computer 601. The components of the computer 601 can include, but are not limited to, one or more processors or processing units 603, a system memory 612, and a system bus 613 that couples various system components including the processor 603 to the system memory 612.

The system bus 613 represents one or more of several possible types of bus structures, including a memory bus or memory controller, a peripheral bus, an accelerated graphics port, and a processor or local bus using any of a variety of bus architectures. By way of example, such architectures can include an Industry Standard Architecture (ISA) bus, a Micro Channel Architecture (MCA) bus, an Enhanced ISA (EISA) bus, a Video Electronics Standards Association (VESA) local bus, and a Peripheral Component Interconnects (PCI) bus also known as a Mezzanine bus. This bus, and all buses specified in this description can also be implemented over a wired or wireless network connection. The bus 613, and all buses specified in this description can also be implemented over a wired or wireless network connection and each of the subsystems, including the processor 603, a mass storage device 604, an operating system 605, application software 606, data 607, a network adapter 608, system memory 612, an Input/Output Interface 610, a display adapter 609, a display device 611, and a human machine interface 602, can be contained within one or more remote computing devices 614a,b,c at physically separate locations, connected through buses of this form, in effect implementing a fully distributed system.

The computer 601 typically includes a variety of computer readable media. Such media can be any available media that is accessible by the computer 601 and includes both volatile and non-volatile media, removable and non-removable media. The system memory 612 includes computer readable media in the form of volatile memory, such as random access memory (RAM), and/or non-volatile memory, such as read only memory (ROM). The system memory 612 typically contains data such as data 607 and and/or program modules such as operating system 605 and application software 606 that are immediately accessible to and/or are presently operated on by the processing unit 603.

The computer 601 may also include other removable/non-removable, volatile/non-volatile computer storage media. By way of example, FIG. 6 illustrates a mass storage device 604 which can provide non-volatile storage of computer code, computer readable instructions, data structures, program modules, and other data for the computer 601. For example, a mass storage device 604 can be a hard disk, a removable magnetic disk, a removable optical disk, magnetic cassettes or other magnetic storage devices, flash memory cards, CD-ROM, digital versatile disks (DVD) or other optical storage, random access memories (RAM), read only memories (ROM), electrically erasable programmable read-only memory (EEPROM), and the like.

Any number of program modules can be stored on the mass storage device 604, including by way of example, an operating system 605 and application software 606. Each of the operating system 605 and application software 606 (or some combination thereof) may include elements of the programming and the application software 606. Data 607 can also be stored on the mass storage device 604. Data 607 can be stored in any of one or more databases known in the art. Examples of such databases include, DB2®, Microsoft® Access, Microsoft® SQL Server, Oracle®, mySQL, PostgreSQL, and the like. The databases can be centralized or distributed across multiple systems.

A user can enter commands and information into the computer 601 via an input device (not shown). Examples of such input devices include, but are not limited to, a keyboard, pointing device (e.g., a "mouse"), a microphone, a joystick, a serial port, a scanner, and the like. These and other input devices can be connected to the processing unit 603 via a human machine interface 602 that is coupled to the system bus 613, but may be connected by other interface and bus structures, such as a parallel port, game port, or a universal serial bus (USB).

A display device 611 can also be connected to the system bus 613 via an interface, such as a display adapter 609. For example, a display device can be a monitor or an LCD (Liquid Crystal Display). In addition to the display device 611, other output peripheral devices can include components such as speakers (not shown) and a printer (not shown) which can be connected to the computer 601 via Input/Output Interface 610.

The computer 601 can operate in a networked environment using logical connections to one or more remote computing devices 614a,b,c. By way of example, a remote computing device can be a personal computer, portable computer, a server, a router, a network computer, a peer device or other common network node, and so on. Logical connections between the computer 601 and a remote computing device 614a,b,c can be made via a local area network (LAN) and a general wide area network (WAN). Such network connections can be through a network adapter 608. A network adapter 608 can be implemented in both wired and wireless environments. Such networking environments are commonplace in offices, enterprise-wide computer networks, intranets, and the Internet 615.

For purposes of illustration, application programs and other executable program components such as the operating system 605 are illustrated herein as discrete blocks, although it is recognized that such programs and components reside at various times in different storage components of the computing device 601, and are executed by the data processor(s) of the computer.

An implementation of the disclosed method may be stored on or transmitted across some form of computer readable media. Computer readable media can be any available media that can be accessed by a computer. By way of example, and not limitation, computer readable media may comprise "computer storage media" and "communications media." "Computer storage media" include volatile and non-volatile, removable and non-removable media implemented in any method or technology for storage of information such as computer readable instructions, data structures, program modules, or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer.

EXAMPLES

Figure 7:
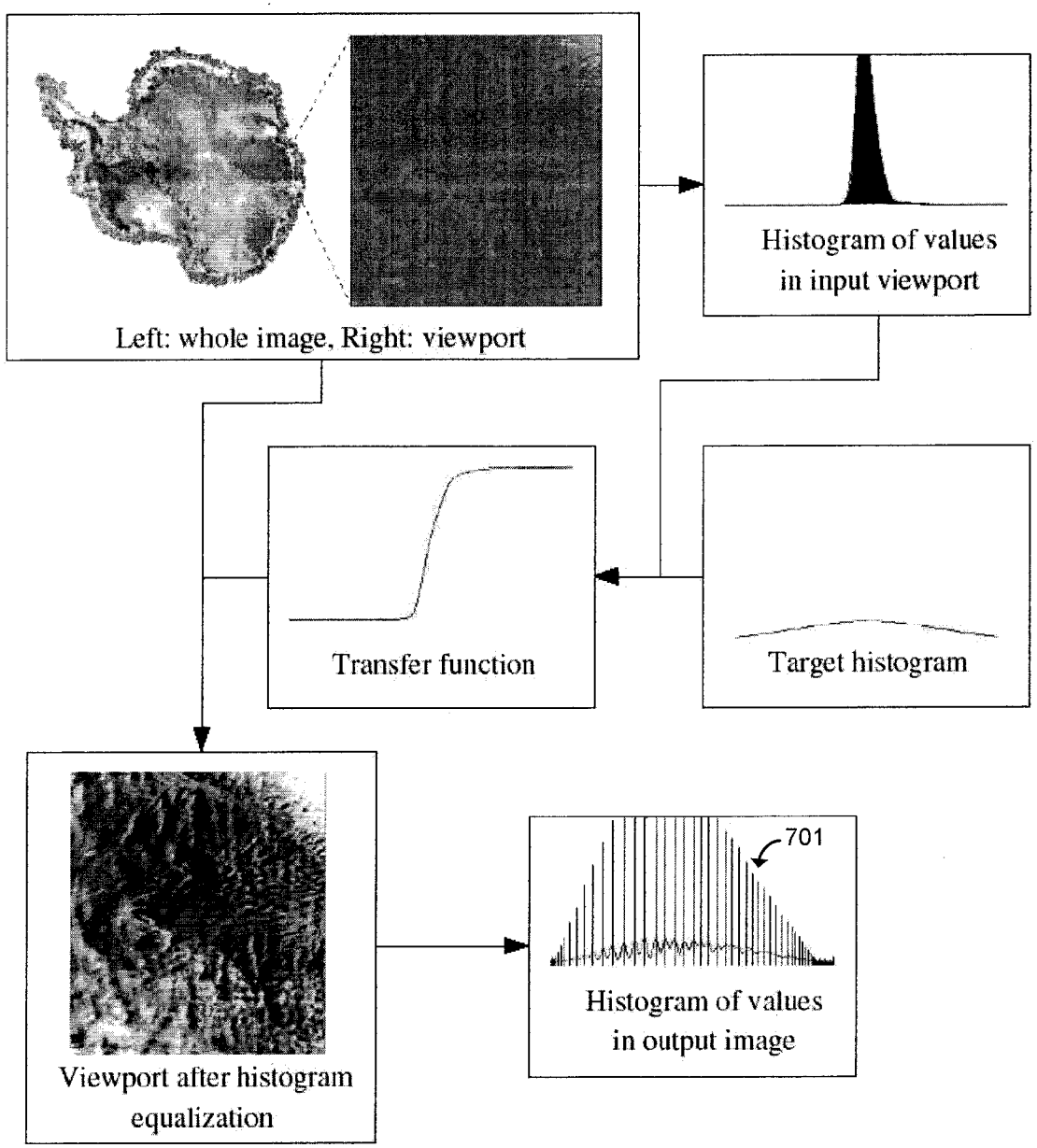
FIG. 7 is an example of the method outlined in FIG. 3.

FIG. 7 is an example of the method outlined in FIG. 3. A histogram is generated for the portion of the image contained within the viewport. A target histogram is given. A transfer function is generated from these two histograms. The transfer function is used to create a transformed image to be displayed in the viewport. The histogram for the final image is shown for clarity: the histogram bars 701 indicate actual values, while the line running through the histogram bars corresponds to a smoothed-out version of the actual values for the final image which is approximately equal to the target histogram that was given.

Figure 8:
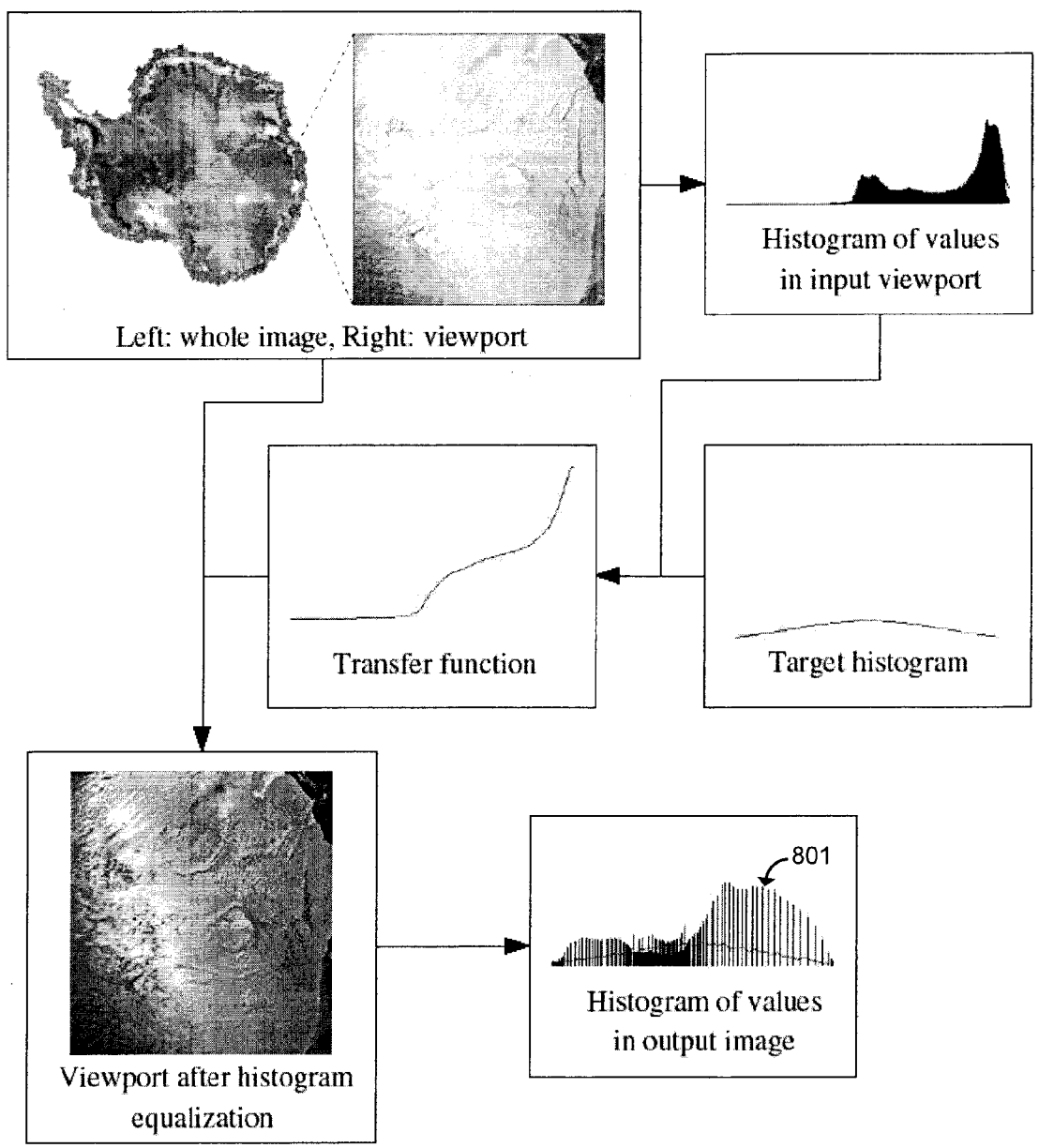
FIG. 8 is another example of the method outlined in FIG. 3, but with a different viewport.

FIG. 8 is another example of the same method, but with a different viewport. The viewport has been scrolled to the right between FIG. 7 and FIG. 8. The histogram for the final image is shown for clarity: the histogram bars 801 indicate actual values, while the line running through the histogram bars corresponds to a smoothed-out version of the actual values for the final image which is approximately equal to the target histogram that was given.

While the methods and systems have been described in connection with preferred embodiments and specific examples, it is not intended that the scope of the methods and systems be limited to the particular embodiments set forth, as the embodiments herein are intended in all respects to be illustrative rather than restrictive.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is no way intended that an order be inferred, in any respect. This holds for any possible non-express basis for interpretation, including: matters of logic with respect to arrangement of steps or operational flow; plain meaning derived from grammatical organization or punctuation; the number or type of embodiments described in the specification.

It will be apparent to those skilled in the art that various modifications and variations can be made in the present methods and systems without departing from the scope or spirit of the methods and systems. Other embodiments of the methods and systems will be apparent to those skilled in the art from consideration of the specification and practice of the methods and systems disclosed herein. It is intended that the specification and examples be considered as exemplary only, with a true scope and spirit of the methods and systems being indicated by the following claims.

The invention claimed is:

1. A computer implemented method for color equalization, comprising:
  (a) determining, by a computer, image statistics for at least a first portion of an input image, wherein the image statistics comprise a histogram;
  (b) generating, by the computer, a transformation function for the first portion of the input image based at least in part on the image statistics;
  (c) enhancing, by performing histogram equalization or contrast stretch by the computer, the first portion of the input image using the transformation function;
  (d) displaying, by the computer, the enhanced first portion of the input image; and
  (e) dynamically and continually repeating, by the computer, steps (a)-(d) for at least a second portion of the input image during an operation that determines the second portion of the input image, wherein the operation is at least one of zooming in, zooming out, or panning.

2. The method of claim 1, wherein the step of determining, by the computer, the image statistics for at least the first portion of the input image, wherein the image statistics comprise a histogram, comprises determining the histogram of the first portion of the input image, wherein the histogram represents a number of pixels of each of a plurality of color values in the first portion of the input image.

3. The method of claim 2, wherein the step of generating, by the computer, the transformation function further comprises receiving a pre-determined target histogram and generating the transformation function based at least in part on the histogram and the pre-determined target histogram.

4. The method of claim 3, wherein the pre-determined target histogram represents a uniform color distribution.

5. The method of claim 3, wherein the pre-determined target histogram represents a Gaussian color distribution.

6. The method of claim 1, further comprising:
  dividing by the computer the input image into at least a first tile and second tile, wherein each of the first tile and the second tiles comprises at least two pixels each having a respective color value;
  determining, by the computer, first tile statistics for the first tile; and
  determining, by the computer, second tile statistics for the second tile,
  wherein the steps of dividing, by the computer, the input image and determining by the computer the first statistics and the second tile statistics occur prior to determining, by the computer, image statistics for at least the first portion of the input image.

7. The method of claim 6, wherein the first portion of the input image comprises at least one of the first tile and the second tiles, and wherein the step of determining by the computer image statistics for at least a first portion of the input image is based at least in part on the tile statistics of the respective one or more tiles of the first portion of the input image.

8. The method of claim 7, wherein the step of determining by the computer the first tile statistics comprises determining by the computer a first tile histogram of the first tile and the step of determining by the computer the second tile statistics comprises determining by the computer a second tile histogram of the second tile, wherein the first tile histogram and second tile histograms represent a number of pixels of each of a plurality of color values in each of the respective first tile and second tiles.

9. The method of claim 8, wherein the step of determining by the computer image statistics for the first portion of the input image comprises determining by the computer a histogram of the first portion of the input image based at least in part on the tile histogram of the respective one or more tiles of the first portion of the input image.

10. The method of claim 9, further comprising receiving by the computer a pre-determined target histogram, wherein the step of generating, by the computer, a transformation function for the first portion of the input image comprises generating, by the computer, a transformation function based on the histogram of the first portion of the input image and the pre-determined target histogram.

11. The method of claim 1, wherein the first portion of the input image is a subset of the second portion of the input image.

12. The method of claim 1, wherein the second portion of the input image is a subset of the first portion of the input image.

13. A computer readable non-transitory storage medium with computer executable instructions embodied thereon for dynamic color equalization, comprising:
 (a) determining image statistics for at least a first portion of an input image, wherein the image statistics comprise a histogram;
 (b) generating a transformation function for the first portion of the input image based at least in part on the image statistics;
 (c) enhancing, by performing histogram equalization or contrast stretch, the first portion of the input image using the transformation function;
 (d) displaying the enhanced first portion of the input image; and
 (e) dynamically and continually repeating steps (a)-(d) for at least a second portion of the input image in response to a received command during an operation on the input image that determines at least in part the second portion of the input image, wherein the operation is at least one of a zoom operation or a pan operation.

14. The computer readable non-transitory storage medium of claim 13, wherein the step of determining, by the computer, the image statistics for at least the first portion of the input image, wherein the image statistics comprise a histogram, comprises determining the histogram of the first portion of the input image, wherein the histogram represents a number of pixels of each of a plurality of color values in the first portion of the input image.

15. The computer readable non-transitory storage medium of claim 14, wherein the step of generating, by the computer, the transformation function further comprises receiving a pre-determined target histogram and generating the transformation function based at least in part on the histogram and the pre-determined target histogram.

16. The computer readable non-transitory storage medium of claim 15, wherein the pre-determined target histogram represents a uniform color distribution.

17. The computer readable non-transitory storage medium of claim 13, wherein the first portion of the input image is a subset of the second portion of the input image.

18. The computer readable non-transitory storage medium of claim 13, wherein the second portion of the input image is a subset of the first portion of the input image.

19. A system, comprising:
 a memory configured for storing image data comprising an input image;
 a processor, coupled to the memory, wherein the processor is configured to perform the steps of:
 (a) receiving an input image;
 (b) determining image statistics for at least a first portion of the input image, wherein the image statistics comprise a histogram;
 (c) generating a transformation function for the first portion of the input image based at least in part on the image statistics;
 (d) enhancing, by performing histogram equalization or contrast stretch, the first portion of the input image using the transformation function;
 (e) displaying the enhanced first portion of the input image; and
 (f) dynamically and continually repeating steps (b)-(e) for at least a second portion of the input image during an operation on the input image, wherein the operation defines dynamically the second portion of the input image and comprises at least one of a zoom operation or a pan operation.

20. The system of claim 19, wherein the step of determining, by the computer, the image statistics for at least the first portion of the input image, wherein the image statistics comprise a histogram, comprises determining the histogram of the first portion of the input image, wherein the histogram represents a number of pixels of each of a plurality of color values in the first portion of the input image.

21. The system of claim 20, wherein the step of generating, by the computer, the transformation function further comprises receiving a pre-determined target histogram and generating the transformation function based at least in part on the histogram and the pre-determined target histogram.

22. The system of claim 21, wherein the pre-determined target histogram represents a uniform color distribution.

23. The system of claim 19, wherein the first portion of the input image is a subset of the second portion of the input image.

24. The system of claim 19, wherein the second portion of the input image is a subset of the first portion of the input image.

* * * * *